(12) United States Patent
Lewecki

(10) Patent No.: US 12,301,143 B2
(45) Date of Patent: May 13, 2025

(54) HARDWARE BASED DATA MANAGEMENT INTERFACE

(71) Applicant: STEERING SOLUTIONS IP HOLDING CORPORATION, Saginaw, MI (US)

(72) Inventor: Michal Lewecki, Tychy (PL)

(73) Assignee: Steering Solutions IP Holding Corporation, Saginaw, MI (US)

( * ) Notice: Subject to any disclaimer, the term of this patent is extended or adjusted under 35 U.S.C. 154(b) by 487 days.

(21) Appl. No.: 17/861,723

(22) Filed: Jul. 11, 2022

(65) Prior Publication Data

US 2023/0198440 A1    Jun. 22, 2023

(30) Foreign Application Priority Data

Dec. 17, 2021  (PL) .......................................... 439889

(51) Int. Cl.
*H02P 23/00* (2016.01)
*B62D 5/04* (2006.01)
*H02P 6/00* (2016.01)
*G06F 12/0802* (2016.01)

(52) U.S. Cl.
CPC .......... *H02P 23/0004* (2013.01); *B62D 5/046* (2013.01); *H02P 6/00* (2013.01); *G06F 12/0802* (2013.01); *G06F 2212/173* (2013.01)

(58) Field of Classification Search
USPC .......................................................... 702/150
See application file for complete search history.

(56) References Cited

U.S. PATENT DOCUMENTS

| | | | |
|---|---|---|---|
| 2015/0025837 A1* | 1/2015 | Collier-Hallman | B62D 5/0481 702/147 |
| 2018/0312196 A1* | 11/2018 | Kim | B62D 6/001 |
| 2019/0028044 A1* | 1/2019 | Ochs | H02P 6/17 |
| 2021/0129328 A1* | 5/2021 | Pipe-Mazo | B25J 9/0084 |
| 2021/0206428 A1* | 7/2021 | Tosh | B62D 5/0487 |
| 2022/0255489 A1* | 8/2022 | Chretien | H02P 29/028 |

* cited by examiner

*Primary Examiner* — Paul D Lee
(74) *Attorney, Agent, or Firm* — Dickinson Wright PLLC

(57) ABSTRACT

A method includes capturing a first sample data signal, the first sample data signal being associated with a first time domain and storing a first value associated with the first sample data signal in a first element position of a first memory buffer. The method also includes generating, in response to a completion of a sampling window and in response to a request from a data consumer, a snapshot of values stored in the first memory buffer and storing the snapshot of values in a data consumer memory. The method also includes extracting, by the data consumer in a second time domain, at least one value from the snapshot of values and calculating, by the data consumer, at least one of a motor position of a motor and a motor velocity of the motor using the at least one value from the snapshot of values.

20 Claims, 5 Drawing Sheets

HARDWARE BASED DATA MANAGEMENT INTERFACE

CROSS-REFERENCES TO RELATED APPLICATIONS

This patent application claims priority to Poland Patent Application Serial No. P.439889, filed Dec. 17, 2021, which is incorporated herein by reference in its entirety.

TECHNICAL FIELD

This disclosure relates to motor control and in particular to systems and methods for providing motor control using a hardware based data management interface.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, or other suitable steering system. The steering system of such a vehicle typically controls various aspects of vehicle steering including providing steering assist to an operator of the vehicle, controlling steerable wheels of the vehicle, and the like.

SUMMARY OF THE INVENTION

This disclosure relates generally to motor control.

An aspect of the disclosed embodiments includes a method for motor control.

The method includes capturing, at a first data producer, a first sample data signal, the first sample data signal being associated with a first time domain and storing, by the first data producer, a first value associated with the first sample data signal in a first element position of a first memory buffer. The first element position of the first memory buffer corresponding to a timestamp of the first sample data signal. The method also includes generating, by a controller, in response to a completion of a sampling window and in response to a request from a data consumer, a snapshot of values stored in the first memory buffer and storing, by the controller, the snapshot of values in a data consumer memory. The method also includes extracting, by the data consumer in a second time domain, at least one value from the snapshot of values and calculating, by the data consumer, at least one of a motor position of a motor and a motor velocity of the motor using the at least one value from the snapshot of values.

Another aspect of the disclosed embodiments includes a system for motor control. The system includes a first data producer configured to capture a first sample data signal, the first sample data signal being associated with a first time domain, and store a first value associated with the first sample data signal in a first element position of a first memory buffer, the first element position of the first memory buffer corresponding to a timestamp of the first sample data signal. The system also includes a controller configured to generate, in response to a completion of a sampling window and in response to a request from a data consumer, a snapshot of values stored in the first memory buffer, and store the snapshot of values in a data consumer memory. The data consumer is configured to extract, in a second time domain, at least one value from the snapshot of values, and calculate at least one of a motor position of a motor and a motor velocity of the motor using the at least one value from the snapshot of values.

Another aspect of the disclosed embodiments includes an apparatus for motor control. The apparatus includes a processor and a memory. The memory includes instructions that, when executed by the processor, cause the processor to: generate, in response to a completion of a sampling window and in response to a request from a data consumer, a snapshot of values stored in a first memory buffer associated with a first data producer, the values stored in the first memory buffer being associated with corresponding sample data signals and the corresponding sample data signals being associated with a first time domain; store the snapshot of values in a data consumer memory; generate, in response to a completion of the sampling window and in response to another request from the data consumer, another snapshot of values stored in a second memory buffer associated with a second data producer, the values stored in the second memory buffer being associated with other corresponding sample data signals and the other corresponding sample data signals being associated with a second time domain; store the other snapshot of values in the data consumer memory; receive at least one of a motor position of a motor and a motor velocity of the motor; and selectively control the motor based on the at least one of the motor position of the motor and the motor velocity of the motor.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
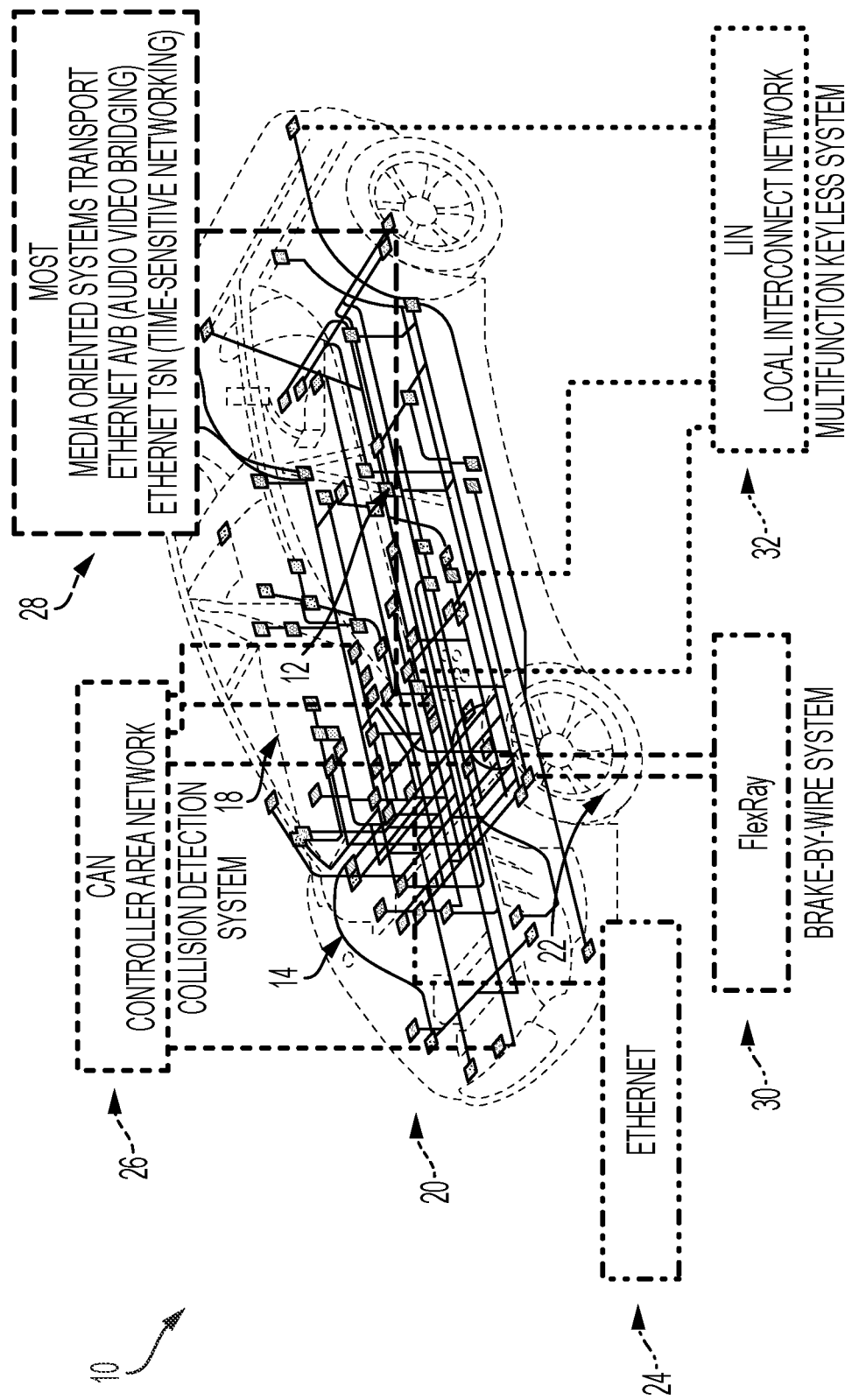
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, or other suitable steering system. The steering system of such a vehicle typically controls various aspects of vehicle steering including providing steering assist to an operator of the vehicle, controlling steerable wheels of the vehicle, and the like.

Typically, a fundamental aspect of an EPS system includes efficient control of motors, such as synchronous brushless direct current (BLDC) motors or other suitable motors, of the EPS system. This may be achieved by using a field oriented control (FOC) scheme for motor commutation. The core of FOC includes determining an electrical field of a rotor (e.g., associated with a motor) and applying three phases currents to align a field of a stator (e.g., of the motor) perpendicular to the field associated with the rotor. This typically requires high quality motor position signals and phases current signals, which may include using advanced sensing hardware circuits, with a processing element (PE) being configured to adequately adjust to support all available features provided by the hardware. Further, such systems may maintain specific cohesion dependencies between both signals to prevent introduction of error in motor torque generation.

In addition to the above, typical EPS systems include core functions that include acquiring and processing raw samples (e.g., of information or data from sensors) into signals of interest. The architectural realization is typically a software based approach that reads peripheral inputs, buffers raw data, processes the raw data, and conveys the processed data to downstream motor control software components. This may significantly impact controller throughput and may be bounded to any operating system interference, causing time critical synchronous event disturbances, which can result in measurement data incoherency. Further, advanced steering functions impose more demanding conditions on the execution rate and may cause signal path delays, which may makes a purely software approach insufficient.

Accordingly, systems and methods, such as those described herein, configured to provide a hardware based data management interface, may be desirable. In some embodiments, the systems and methods described herein may be configured to acquire motor position samples and calculate motor velocity signals, while maximizing the cohesion with phase current samples and/or any other control related samples or signals. The systems and method described herein may be configured to sustain the required signal to noise ratio and signal bandwidth of various legacy software approaches. The systems and method described herein may be configured to utilize hardware acceleration to improve controller throughput (e.g., by executing the acquisition without software interaction and using preliminary data ordering and equally spaced samples in time).

The systems and method described herein may be configured to provide independence from motor control service routine execution (e.g., while data coherency maintained by hardware mechanisms). The systems and method described herein may be configured to provide independence from pulse width modulation (PWM) dither (e.g., using an exclusive spectrum spread control of signals). The systems and method described herein may be configured to provide a configurable sample frequency (e.g., with measurement execution rate being configured to match sensing hardware maximum operation characteristics). The systems and method described herein may be configured to provide a reduced signal path delay (e.g., with position and phases current signals synchronously acquired).

In some embodiments, the systems and methods described herein may be configured to maximize hardware utilization and support a unified technique for data access for EPS system functions. The systems and methods described herein may be configured to provide an improved method for acquisition and presentation of input data for motor velocity calculation. The systems and methods described herein may be configured to use existing, internal hardware peripherals, which may reduce controller (e.g., processor or possessing element) workload by running in background and creating conditions to execute faster computation algorithms.

The systems and methods described herein may be configured to use timers, quadrature signal decoders, serial communication interfaces, analog-to-digital converters (ADC), arbitral serial interfaces, direct memory access, peripheral routing, and the like. Each peripheral unit may include dedicated features that support a variety of operations. The systems and methods described herein may be configured to connect peripherals, such that, signal processing using the peripherals may increase throughput of the system. The systems and methods described herein may be configured to provide a hardware accelerated data management interface for input signals acquisition and distribution within the embedded system of the EPS system or other suitable system.

Figure 3:
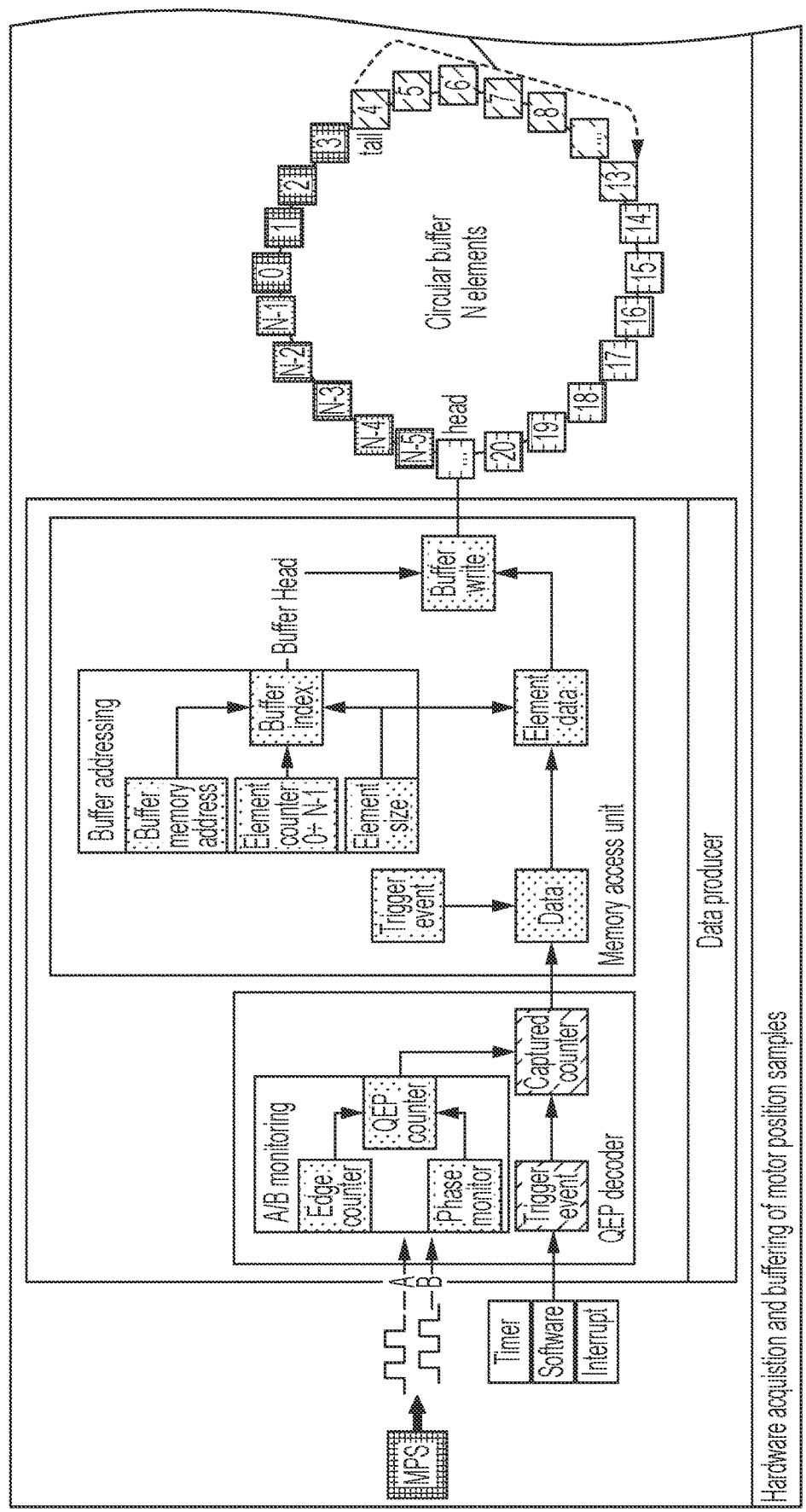
FIG. 3 generally illustrates a schematic view of a motor control system according to the principles of the present disclosure.
Figure 3:
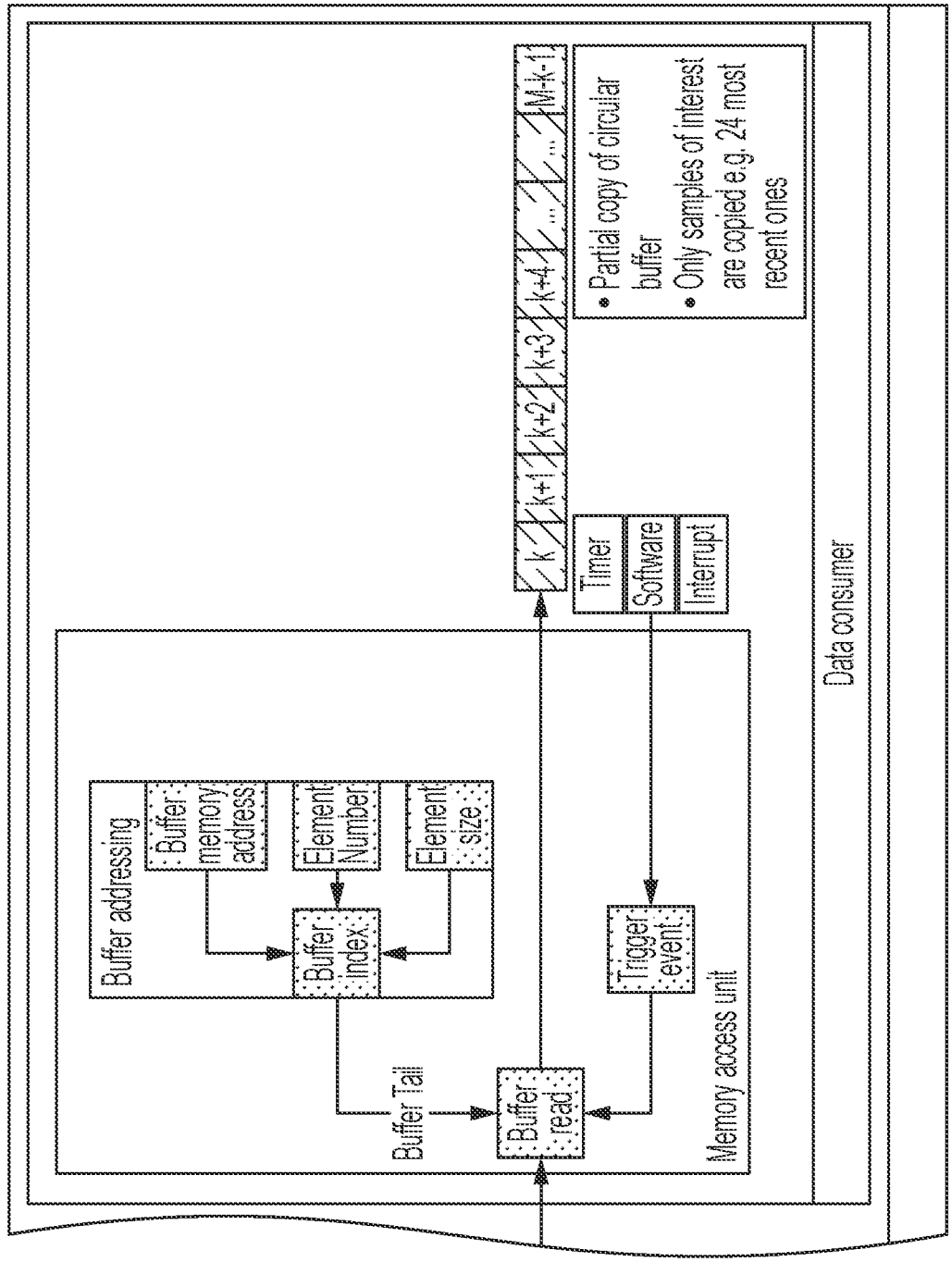

In some embodiments, the systems and methods described herein may be configured to store each obtained motor signal sample in a dedicated memory space by a data producer, as is generally illustrated in FIG. 3. The systems and methods described herein may be configured to store a signal in an element position within a buffer. The element position within buffer may directly correspond to timestamp. The systems and methods described herein may be configured to, when a predefined sampling window is complete and a data consumer requests data for execution, generate a snapshot of acquired data set and move the snapshot to a specific memory for computation purpose (e.g., which may provide synchronization between two independent time domains for measuring and processing of signals). The window size and frequency may be configurable (e.g., even during runtime), which may allow for flexible adjustment to meet system requirements. The systems and methods described herein may be configured to execute all operations, once set, without main controller interaction for the rest of execution.

With reference again to FIG. 3, a quadrature signal is sourced on a quadrature encoder pulse (QEP) decoder input channels A and B. It continuously monitors the incoming sequence of edges and calculates the counter value that convey the motor angular displacement. A predefined source of trigger event initiates a capture of QEP counter. This may include a software or hardware mechanism that dictates a specific execution rate (e.g. 50 microseconds (us), 100 us, 200 us, or other suitable rate). When capture is completed, the value is automatically transferred by memory access unit to dedicated random access memory (RAM) array. Memory unit internally handles the indexing and ordering of elements according to configured parameters (e.g., element size, array size, current array utilization, and the like). The memory unit may autonomously realize a circular buffer concept. The memory management happens all in background, without requiring controller intervention, saving processor computation throughput for actual processing.

On the data consumer side, an extraction and processing of data may take place. The data consumer begins with synchronization of event occurrence that includes copying certain parts of the circular buffer. It is possible to set it off by hardware sources like peripheral transfer completion flag, timer interrupt, or directly from software. When triggered, the memory access unit of the data consumer transfers samples of interest required by the processing part algorithm (e.g., being executed by the data consumer). This may include all available samples or a subset of samples (e.g., most recent values—minimal acquisition delay of signal, every nth value—down sampling of signal samples overlapping—windowing of signal for further filtering, and the like).

In some embodiments, a "latch" mechanism enables a data consumer to operate at different execution rates from the data producer and maintain synchronicity between domains. Further, software calculations can start immediately after transfer is completed, which may result in minimal signal path lag that impacts final results frequency response. The data producer function is realized only with hardware accelerated features, while the data consumer consists of hardware extraction and software based algorithm implementation. The signal producer part is capable of reacting to different types of system events that drive the data obtaining moments. Additionally, or alternatively, a particular scenario is possible when a single system trigger occurrence can initiate a chain of operations that acquire and buffer samples of various signals available for measuring.

In some embodiments, dedicated front-end modules convert different types of inputs to a common representation in the system. The final result may include a set of circular buffers, continuously filled with data at designed signal rate. Additionally, or alternatively, specific system functions may obtain data for processing through synchronization requests. All sampling events may be managed in a preconfigured order by the memory management unit, which inherently provides cohesion of data processed.

The consumer end points access the data without having to account for coherency and synchronization of data, using available resources for the signal processing. The systems and methods described herein may be configured to use hardware accelerated acquisition to maintain constant sampling rate of a position of the rotor. All angle values may be equally spaced in time. The systems and methods described herein may be configured to provide a motor velocity estimation technique that may account for the specification by simplifying time dependent aspects of various equations. By manipulating the original formula expression to decouple the position and time variables, the systems and methods described herein may be configured to obtain a vector dot product form that is implementation efficient in signal processing application. This may be represented as:

$$\beta = \sum_{i}^{N} \beta_i * y_i$$

$$\beta_i = \frac{N * x_i - \sum_k x_k}{N\left(\sum_k x_k^2\right) - \left(\sum_k x_k\right)^2}$$

Where $\beta$ is a representation of rate of position displacement ($y_i$) sampled in discreet time spots $x_k$ (e.g., desired velocity signal). Because the $x_i$ are known a priori (e.g., for specific size of sample window) it is possible to precompute all $\beta_i$ coefficients and store them in memory. Therefore, a tapped-delay line filter structure can be used to estimate the motor position velocity.

The systems and methods described herein may be configured to provide a "finite impulse response (FIR) slope filtering" algorithm or other suitable filtering algorithm or other suitable algorithm. The fundamental math operation behind it is convolution, implemented as set of multiple and accumulate instructions. This type of computation scheme may provide improvement of processing throughput due to native support of the multiply-accumulate (MAC) instruction by a hardware math unit.

In some embodiments, the systems and methods described herein may be configured to calculate motor velocity with a relatively short execution time (e.g., ~4.27 us*4). The systems and methods described herein may be configured to acquire samples and buffer the samples directly using steering system hardware, other vehicle hardware, or any suitable hardware (e.g., without executed inside motor control service routine). The systems and methods described herein may be configured to use a buffer having a size for acquisition of 48 bytes (e.g., with a window size of 24 samples) or other suitable size (e.g., and corresponding window size). It should be understood that, while limited examples are provided herein, the systems and methods described herein may be configured to provide any suitable output using any suitable signals and corresponding hardware, in addition to or instead of those described herein.

In some embodiments, the systems and methods described herein may be configured to equally space (e.g., or distribute, collect, and the like) samples at a predetermined interval (e.g., such as every 100 us or other suitable interval). The systems and methods described herein may be configured to use an entire collection (e.g., all collected or acquired) of position signals to estimate motor velocity and/or position. The systems and methods described herein may be configured to support sample to sample signal estimation. The systems and methods described herein may be configured to estimate motor velocity and/or position independent from motor control service routine.

In some embodiments, the systems and methods described herein may be configured to control, for an EPS system or other suitable vehicle or non-vehicle system, reaction to external factors and internal states. The systems and methods described herein may be configured to provide a hardware based universal interface for data management. The systems and methods described herein may be configured to provide: uniform data presentation and distribution in the EPS system or other vehicle or non-vehicle system; significant throughput reduction of the controller (e.g., or processing element); separation and synchronization of sampling and processing domains; and flexibility in configuration of acquisition rate. The systems and methods described herein may be configured to utilize resources commonly available within general purpose microcontroller devices. The systems and methods described herein may be configured to adjust the configuration layer of data producers for defined computation needs.

In some embodiments, the systems and methods described herein may be configured to capture an arbitral signal data sample using a dedicated hardware means, specific to the signal nature, by the data producer operating at fixed time domain. The fixed time domain may be associated with the signal measured. The systems and methods described herein may be configured to store the data value by a dedicated memory management hardware, within a memory buffer, associated with the data producer. The element position within buffer may correspond to a timestamp, referenced to the producer operating time domain, of the sample data.

The systems and methods described herein may be configured to, on demand, generate, by memory management controller, in response to a completion of a sampling window and in response to a request from a data consumer, the snapshot of values stored in the memory buffer (e.g., associated with data producer). The systems and methods described herein may be configured to store, by the memory management controller, the snapshot values in a memory buffer (e.g., associated with the data consumer issuing the request). The systems and methods described herein may be configured to extract data, by the data consumer operating at fixed time domain (e.g., which may be different or same as the associated data producer), arbitral selection of values from the snapshot of values. The systems and methods described herein may be configured to execute, by the data consumer, an algorithm configured to process the signal captured by the associated data producer.

In some embodiments, the systems and methods described herein may be configured to, using the data consumer, process raw data associated with the various snapshot and generate final results, such as motor position, motor velocity, and the like. It should be understood that, while limited examples are provided herein, the systems and methods described herein may be configured to generate any suitable result, in addition to or other than those described herein.

In some embodiments, the systems and methods described herein may be configured to capture, at a first data producer, a first sample data signal. The first sample data signal may be associated with a first time domain. The first data producer may include a timer, a quadrature signal decoder, analog-to-digital converter, an arbitral serial interface, other suitable peripheral or component, or a combination thereof. The systems and methods described herein may be configured to store, by the first data producer, a first value associated with the first sample data signal in a first element position of a first memory buffer. The first element position of the first memory buffer may correspond to a timestamp of the first sample data signal.

The systems and methods described herein may be configured to generate, by a controller, in response to a completion of a sampling window and in response to a request from a data consumer, a snapshot of values stored in the first memory buffer. The systems and methods described herein may be configured to store, by the controller, the snapshot of values in a data consumer memory. The systems and methods described herein may be configured to extract, by the data consumer in a second time domain, at least one value from the snapshot of values. The systems and methods described herein may be configured to calculate, by the data consumer, at least one of a motor position of a motor and a motor velocity of the motor using the at least one value from the snapshot of values.

The systems and methods described herein may be configured to generate, by the controller, in response to a completion of the sampling window and in response to another request from the data consumer, another snapshot of values stored in a second memory buffer associated with a second data producer. The systems and methods described herein may be configured to store, by the controller, the other snapshot of values in the data consumer memory. The controller may continue to iteratively generate various snapshots for various data collected during various windows.

In some embodiments, the first time domain and the second time domain may include the same time domain or different time domains and/or the same or different characteristics. In some embodiments, the first sample data signal is further associated with a first rate and the at least one value extracted, by the data consumer, is associated with a second rate. In some embodiments, the first rate and the second rate may include the same rate or different rates.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), or other suitable steering system. The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
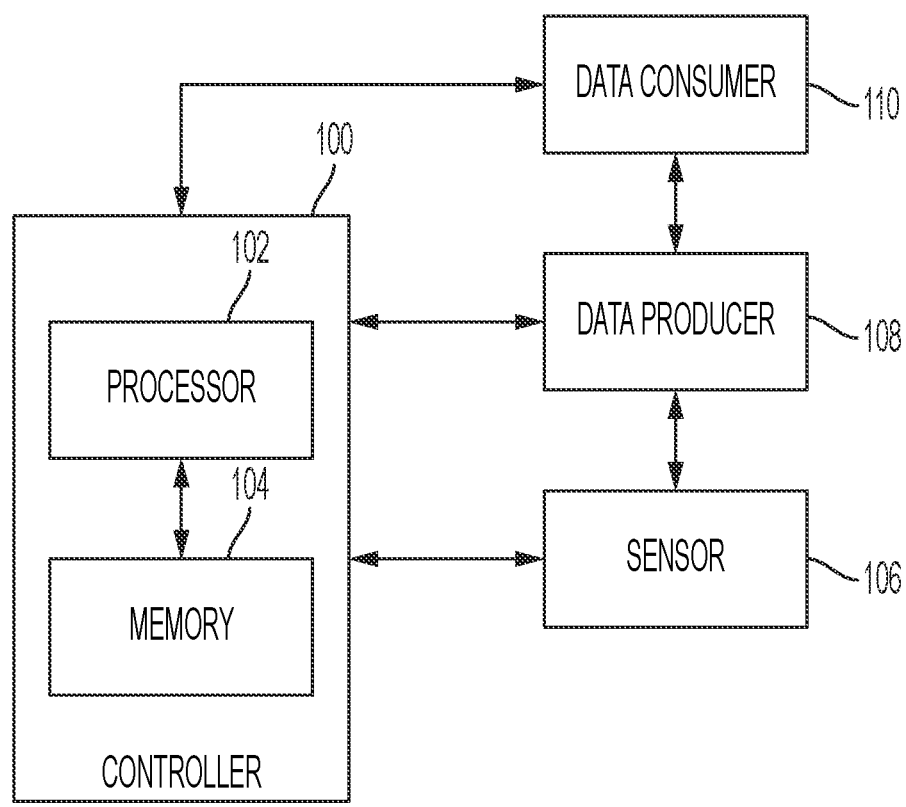
FIG. 2 generally illustrates a motor control system according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, controller 100 may be configured to cooperatively operate with a data producer 108 and a data consumer 110 to estimate motor velocity and/or motor position of a motor, such as one or more motors of the steering system (e.g., the EPS system of the vehicle 10 or other suitable steering system) or any other suitable system of the vehicle 10. The data producer 108 may include a timer, a quadrature signal decoder, an analog-to-digital converter, an arbitral serial interface, other suitable peripheral or component, or other suitable data producer, or a combination thereof. While only the data producer 108 is generally illustrated, it should be understood that the controller 100 may cooperatively operate with any suitable number of data producers in addition to or instead of those described herein. The data consumer 110 may include any suitable data consumer configured to estimate motor velocity and/or motor position of the motor. While only the data consumer 110 is generally illustrated, it should be understood that the controller 100 may cooperatively operate with any suitable number of data consumers in addition to or instead of those described herein.

The data producer 108 may capture, from one or more of the sensors 106, a first sample data signal. The first sample data signal may be associated with a first time domain and/or a first rate. The data producer 108 may store a first value associated with the first sample data signal in a first element position of a first memory buffer. The first element position of the first memory buffer may correspond to a timestamp of the first sample data signal.

The controller 100 may generate, in response to a completion of a sampling window and/or in response to a request from the data consumer 110 (e.g., requesting data for use in estimating the motor velocity and/or motor position), a snapshot of values stored in the first memory buffer. The controller 100 may store the snapshot of values in a data consumer memory of the data consumer 110.

In some embodiments, the data consumer 110 may request data from the memory buffer, as described. The data consumer 110 may access the data consumer memory to retrieve data from the snapshot of values. The data consumer 110 may extract, in a second time domain and/or at a second rate, at least one value from the snapshot of values. The first time domain and the second time domain may include the same time domain or different time domains. The first rate and the second rate may include the same rate or different rates. The data consumer 110 may calculate, using the equations described herein or other suitable equations or techniques, a motor position of the motor, a motor velocity of the motor, or a combination thereof using an arbitral selection of values from the snapshot of values.

The systems and methods described herein may be configured to generate, by the controller, in response to a completion of the sampling window and in response to another request from the data consumer, another snapshot of values stored in a second memory buffer associated with a second data producer. The systems and methods described herein may be configured to store, by the controller, the other snapshot of values in the data consumer memory. The controller may continue to iteratively generate various snapshots for various data collected during various windows.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 4:
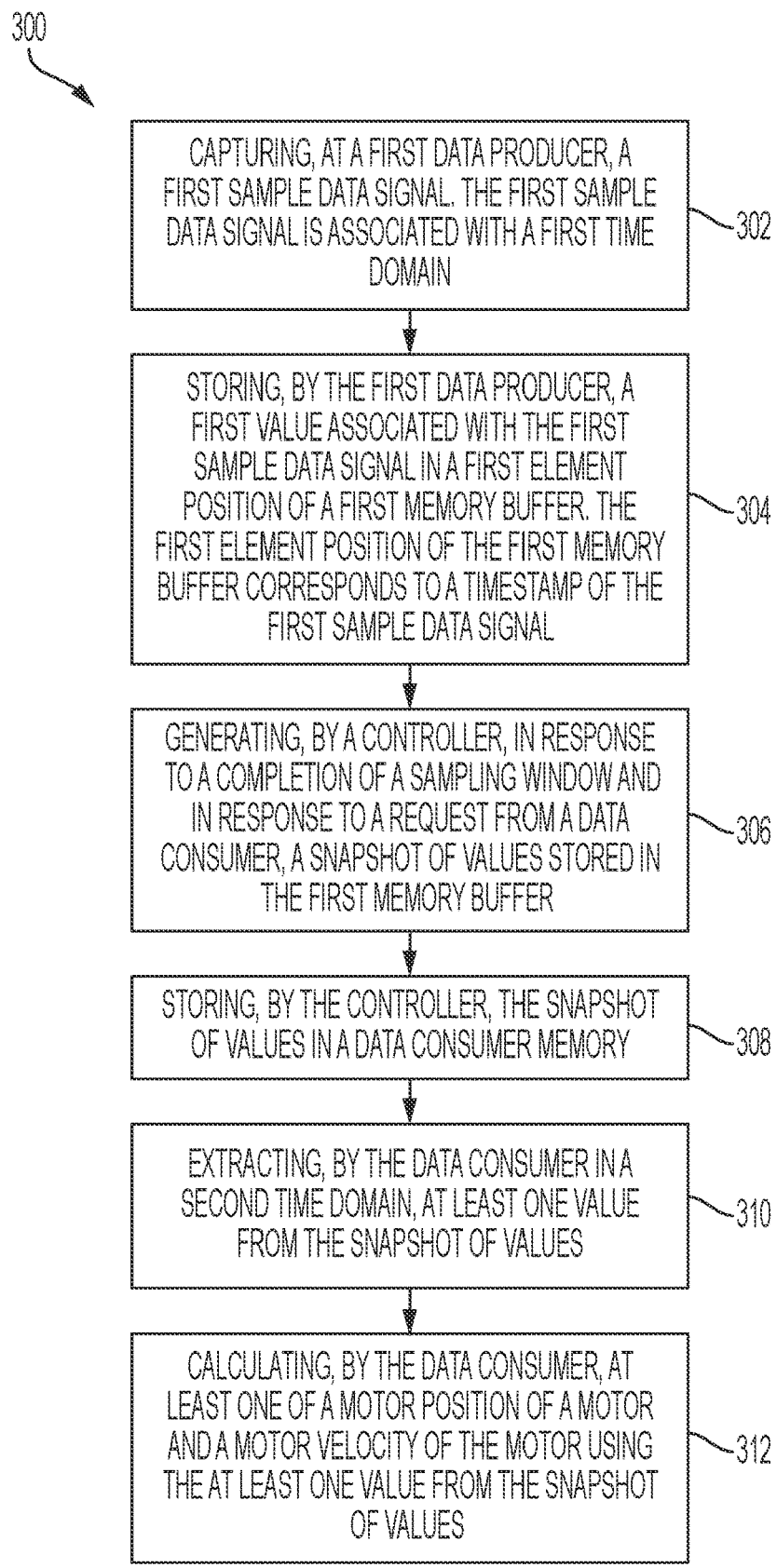
FIG. 4 is a flow diagram generally illustrating a motor control method according to the principles of the present disclosure.

FIG. 4 is a flow diagram generally illustrating a motor control method 300 according to the principles of the present disclosure. At 302, the method 300 captures, at a first data producer, a first sample data signal. For example, the data producer 108 may capture the first sample data signal. The first sample data signal may be associated with a first time domain.

At 304, the method 300 stores, by the first data producer, a first value associated with the first sample data signal in a first element position of a first memory buffer. For example, the data producer 108 may store the first value associated with the first sample data signal. The first element position of the first memory buffer may correspond to a timestamp of the first sample data signal.

At 306, the method 300 generates, by a controller, in response to a completion of a sampling window and in response to a request from a data consumer, a snapshot of values stored in the first memory buffer. For example, the controller 100 may generate, in response to a completion of a sampling window and in response to a request from the data consumer 110, a snapshot of values stored in the first memory buffer.

At 308, the method 300 stores, by the controller, the snapshot of values in a data consumer memory. For example, the controller 100 may store the snapshot of the values in a data consumer memory associated with the data consumer 110.

At 310, the method 300 extracts, by the data consumer in a second time domain, at least one value from the snapshot of values. For example, the data consumer 110 may extract, in the second time domain, the at least one value from the snapshot of values.

At 312, the method 300 calculates, by the data consumer, at least one of a motor position of a motor and a motor velocity of the motor using the at least one value from the snapshot of values. For example, the data consumer 110 may calculate at least one of a motor position of a motor and a motor velocity of the motor using the at least one value from the snapshot of values.

In some embodiments, a method for motor control includes capturing, at a first data producer, a first sample data signal, the first sample data signal being associated with a first time domain and storing, by the first data producer, a first value associated with the first sample data signal in a first element position of a first memory buffer. The first element position of the first memory buffer corresponding to a timestamp of the first sample data signal. The method also includes generating, by a controller, in response to a completion of a sampling window and in response to a request from a data consumer, a snapshot of values stored in the first memory buffer and storing, by the controller, the snapshot of values in a data consumer memory. The method also includes extracting, by the data consumer in a second time domain, at least one value from the snapshot of values and calculating, by the data consumer, at least one of a motor position of a motor and a motor velocity of the motor using the at least one value from the snapshot of values.

In some embodiments, the motor is associated with a steering system. In some embodiments, the steering system includes an electronic power steering system. In some embodiments, the first time domain and the second time domain include the same time domain. In some embodiments, the first time domain and the second time domain include different time domains. In some embodiments, the first sample data signal is further associated with a first rate and the at least one value extracted, by the data consumer, is associated with a second rate. In some embodiments, the first rate and the second rate include the same rate. In some embodiments, the first rate and the second rate include different rates. In some embodiments, the first data producer includes one of a timer, a quadrature signal decoder, an analog-to-digital converter, an arbitral digital serial interface (e.g., such as an serial peripheral interface, a single edge nibble transmission interface, an inter-integrated circuit (I2C), and the like). In some embodiments, the method also includes generating, by the controller, in response to a completion of the sampling window and in response to another request from the data consumer, another snapshot of values stored in a second memory buffer associated with a second data producer and storing, by the controller, the other snapshot of values in the data consumer memory.

In some embodiments, the method may also include capturing, an arbitral signal data sample by a dedicated hardware means, specific to the signal nature, by the data producer operating at a fixed time domain, associated with the signal measured. The method may also include storing the data value by a dedicated memory management hardware, within a memory buffer, associated with the data producer, at a position that corresponds to a timestamp, referenced to the producer operating time domain. The method may also include generating, by the memory management controller, in response to a completion of a sampling window and in response to a request from a data consumer, the snapshot of values stored in the memory buffer, associated with the data producer. The method may also include storing, by the memory management controller the snapshot values in a memory buffer, associated with the data consumer that issued the request generation. The method may also include extracting, by the data consumer operating at a fixed time domain, different or same as the associated data producer, arbitral selection of values from the snapshot of values The method may also include executing, by the data consumer, an algorithm intended to process the signal captured by the associated data producer In some embodiments, a system for motor control includes a first data producer configured to capture a first sample data signal, the first sample data signal being associated with a first time domain, and store a first value associated with the first sample data signal in a first element position of a first memory buffer, the first element position of the first memory buffer corresponding to a timestamp of the first sample data signal. The system also includes a controller configured to generate, in response to a completion of a sampling window and in response to a request from a data consumer, a snapshot of values stored in the first memory buffer, and store the snapshot of values in a data consumer memory. The data consumer is configured to extract, in a second time domain, at least one value from the snapshot of values, and calculate at least one of a motor position of a motor and a motor velocity of the motor using the at least one value from the snapshot of values.

In some embodiments, the motor is associated with a steering system. In some embodiments, the steering system includes an electronic power steering system. In some embodiments, the first time domain and the second time domain include the same time domain. In some embodiments, the first time domain and the second time domain include different time domains. In some embodiments, the first sample data signal is further associated with a first rate and the at least one value extracted, by the data consumer, is associated with a second rate. In some embodiments, the first rate and the second rate include the same rate. In some embodiments, the first rate and the second rate include different rates. In some embodiments, the first data producer includes one of a timer, a quadrature signal decoder, an analog-to-digital converter, and an arbitral serial interface.

In some embodiments, an apparatus for motor control includes a processor and a memory. The memory includes instructions that, when executed by the processor, cause the processor to: generate, in response to a completion of a sampling window and in response to a request from a data consumer, a snapshot of values stored in a first memory buffer associated with a first data producer, the values stored in the first memory buffer being associated with corresponding sample data signals and the corresponding sample data signals being associated with a first time domain; store the snapshot of values in a data consumer memory; generate, in response to a completion of the sampling window and in response to another request from the data consumer, another snapshot of values stored in a second memory buffer associated with a second data producer, the values stored in the second memory buffer being associated with other corresponding sample data signals and the other corresponding sample data signals being associated with a second time domain; store the other snapshot of values in the data consumer memory; receive at least one of a motor position of a motor and a motor velocity of the motor; and selectively control the motor based on the at least one of the motor position of the motor and the motor velocity of the motor.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:
1. A method for motor control, the method comprising:
capturing, at a first data producer, a first sample data signal, the first sample data signal being associated with a first time domain;
storing, by the first data producer, a first value associated with the first sample data signal in a first element position of a first memory buffer, the first element position of the first memory buffer corresponding to a timestamp of the first sample data signal;

generating, by a controller, in response to a completion of a sampling window and in response to a request from a data consumer, a snapshot of values stored in the first memory buffer;

storing, by the controller, the snapshot of values in a data consumer memory;

extracting, by the data consumer in a second time domain, at least one value from the snapshot of values;

calculating, by the data consumer, at least one of a motor position of a motor and a motor velocity of the motor using the at least one value from the snapshot of values.

2. The method of claim 1, wherein the motor is associated with a steering system.

3. The method of claim 2, wherein the steering system includes an electronic power steering system.

4. The method of claim 1, wherein the first time domain and the second time domain include the same time domain.

5. The method of claim 1, wherein the first time domain and the second time domain include different time domains.

6. The method of claim 1, wherein the first sample data signal is further associated with a first rate and the at least one value extracted, by the data consumer, is associated with a second rate.

7. The method of claim 6, wherein the first rate and the second rate include the same rate.

8. The method of claim 6, wherein the first rate and the second rate include different rates.

9. The method of claim 1, wherein the first data producer includes one of a timer, a quadrature signal decoder, an analog-to-digital converter, and an arbitral digital serial interface.

10. The method of claim 1, further comprising:
generating, by the controller, in response to a completion of the sampling window and in response to another request from the data consumer, another snapshot of values stored in a second memory buffer associated with a second data producer; and
storing, by the controller, the other snapshot of values in the data consumer memory.

11. A system for motor control, the system comprising:
a first data producer configured to:
capture a first sample data signal, the first sample data signal being associated with a first time domain; and
store a first value associated with the first sample data signal in a first element position of a first memory buffer, the first element position of the first memory buffer corresponding to a timestamp of the first sample data signal;
a controller configured to:
generate, in response to a completion of a sampling window and in response to a request from a data consumer, a snapshot of values stored in the first memory buffer; and
store the snapshot of values in a data consumer memory; and
the data consumer configured to:
extract, in a second time domain, at least one value from the snapshot of values; and
calculate at least one of a motor position of a motor and a motor velocity of the motor using the at least one value from the snapshot of values.

12. The system of claim 11, wherein the motor is associated with a steering system.

13. The system of claim 12, wherein the steering system includes an electronic power steering system.

14. The system of claim 11, wherein the first time domain and the second time domain include the same time domain.

15. The system of claim 11, wherein the first time domain and the second time domain include different time domains.

16. The system of claim 11, wherein the first sample data signal is further associated with a first rate and the at least one value extracted, by the data consumer, is associated with a second rate.

17. The system of claim 16, wherein the first rate and the second rate include the same rate.

18. The system of claim 16, wherein the first rate and the second rate include different rates.

19. The system of claim 11, wherein the first data producer includes one of a timer, a quadrature signal decoder, an analog-to-digital converter, and an arbitral serial interface.

20. An apparatus for motor control, the apparatus comprising:
a processor; and
a memory including instructions that, when executed by the processor, cause the processor to:
generate, in response to a completion of a sampling window and in response to a request from a data consumer, a snapshot of values stored in a first memory buffer associated with a first data producer, the values stored in the first memory buffer being associated with corresponding sample data signals and the corresponding sample data signals being associated with a first time domain;
store the snapshot of values in a data consumer memory;
generate, in response to a completion of the sampling window and in response to another request from the data consumer, another snapshot of values stored in a second memory buffer associated with a second data producer, the values stored in the second memory buffer being associated with other corresponding sample data signals and the other corresponding sample data signals being associated with a second time domain;
store the other snapshot of values in the data consumer memory;
receive at least one of a motor position of a motor and a motor velocity of the motor; and
selectively control the motor based on the at least one of the motor position of the motor and the motor velocity of the motor.

* * * * *